Dec. 27, 1938. H. ALLEN 2,141,835

RELIEF VALVE

Original Filed July 8, 1933

Inventor
HERBERT ALLEN

By Jesse R. Stone
Lester B. Clark
Attorneys.

Patented Dec. 27, 1938

2,141,835

UNITED STATES PATENT OFFICE 2,141,835

RELIEF VALVE

Herbert Allen, Houston, Tex., assignor to Abercrombie Pump Co., Houston, Tex., a corporation of Texas Original application July 8, 1933, Serial No. 679,467, now Patent No. 2,071,376, dated February 23, 1937. Divided and this application August 24, 1936, Serial No. 97,493

2 Claims. (Cl. 137—53)

This application is a division of my application Serial No. 679,467, filed July 8, 1933, which has matured into Patent No. 2,071,376, granted February 23, 1937.

The invention relates to an improvement in shearing relief valves which are adapted for connection to fluid pressure lines or pumps wherein it is desired that the pressure will be released when such pressure exceeds a predetermined amount.

It is one of the objects of the invention to provide a relief valve wherein the valve member normally remains in closed position, but is adapted to be released by the shearing of a member so that the valve will move to open position and be cushioned when it arrives in full open position.

Another object of the invention is to provide a tapered stem for relief valves in combination with a cushioning member so that upon release of the valve the shock of opening will be absorbed by the cushioning.

Another object of the invention is to provide a tapered stem for relief valves so that the stem will tend to expand a cushion and form a seal about the valve stem.

A still further object of the invention is to provide a shear relief valve which may release at different pressures.

A still further object of the invention is to provide shear pins of varying sizes for the relief valve so that the valve may have a wider usage and be adaptable for connection to lines having different pressures.

Other and further objects of the invention will be readily apparent when the following description is considered in connection with the accompanying drawing wherein.

The present application relates to somewhat the same general construction as disclosed in my copending application for a relief valve, Serial No. 588,280, filed January 23, 1932, which has matured into Patent No. 2,071,375, granted February 23, 1937.

Figure 1:
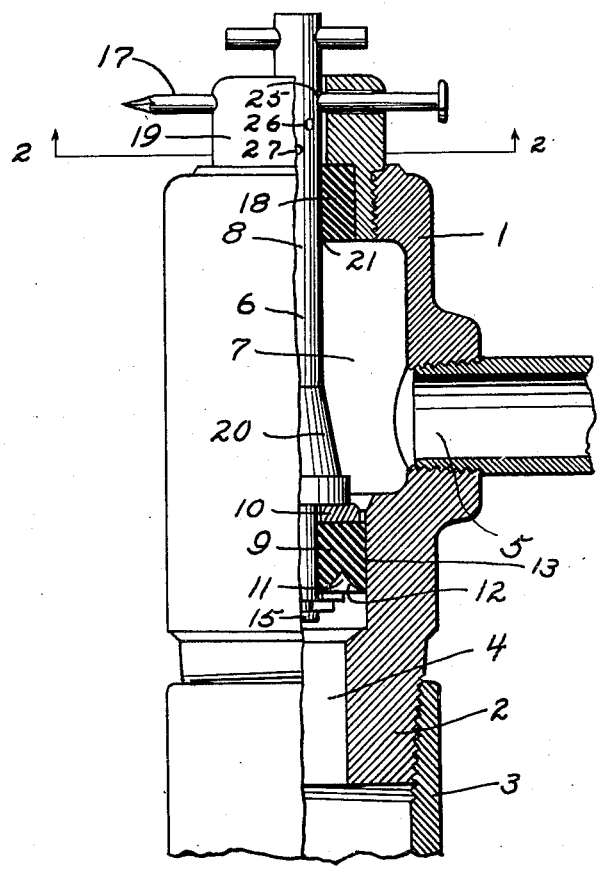
Fig. 1 is a side elevation partly in section illustrating the arrangement of the usual valve construction.

The valve embodies a housing illustrated at 1 in Fig. 1, which may be of any desired configuration. It is intended, however, that the shank 2 thereof will be threaded or flanged for attachment to the pipeline 3 where the pressure is to be relieved or to any other container to which the valve is to be applied. The body is provided with the entrance passage 4 and the discharge passage 5. The valve member 6 is slidably positioned within the housing in order to close the entrance passage 4 against the escape of fluid except when the pressure of the fluid exceeds a predetermined value, which may vary in accordance with the use of the valve.

The valve member is deposited in the relief chamber 7 and is made up of a stem 8, which carries the resilient packing ring 9 and the washer 10, which supports the packing member 9. The packing member may be of rubber or other suitable composition which will withstand the pressures to be encountered, and is preferably of the lip type which has the annular groove 11 therein so that when pressure is applied to the exposed face 12 the packing will tend to expand and form a tight seal against the seating face 13 and against the stem 8. This packing 9 has considerable resilience, so that in event the packing adheres to the seating face 13 pressure applied to the face 12 will cause movement of the stem 8, which will release the valve. This packing is held on the stem by means of a retaining pin 15. The general form of this packing ring is shown in my prior copending application referred to hereinbefore.

One of the principal features of the present invention is the arrangement whereby the valve member is gradually brought to a stop at the time shearing occurs. It seems obvious that when the shear pin 17 releases that the entire valve member will move back sharply against the cushion 18, which is carried by the cap 19 attached to the body 2. It has been found, however, that the cushion 18, in addition to stopping the valve member when it moves to open position, can also be used to form a seal about the stem 8 to prevent any leakage from the valve housing. With this in mind, the stem 8 has a tapered portion 20 thereon, which is adapted to move into the opening 21 of the cushion 18 as the valve moves to open position.

When the pin 17 shears the valve will move quickly until the tapered portion 20 engages the cushion 18. This permits a quick relief of the pressure because the packing 9 moves out of its seat 13 and into the relief chamber 7 very quickly. As soon as the valve is completely open, however, the tapered portion 20 engages the cushion 21 and because of the enlarging diameter the cushion 18 is gradually expanded to bring the valve member to a stop. The taper 20 forms a seal with the cushion, so that there can be absolutely no leakage from the valve when it is in open position.

Figure 2:
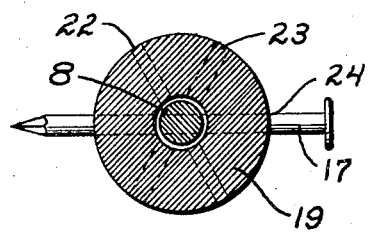
Fig. 2 is a section taken on the line 2—2 of Fig. 1 looking in the direction of the arrows and illustrating one form of arrangement wherein different sized shear pins may be provided.

Fig. 2 shows the arrangement for providing adjustability of the valve in order to adapt it to different operating conditions and obtain different shearing values. With this in mind, a plurality of transverse openings, such as 22, 23 and 24, are provided. While three openings have been shown, it seems obvious that any desired number may be provided. Each of these openings is of a different diameter and adapted to receive a different size shear pin. The pin 17 is shown in the largest diameter hole and, of course, will thus provide the greatest shearing strength. When the valve is to be applied to a particular location, a pin may be inserted in the proper size opening in order to obtain the desired shearing strength. It seems obvious that the shearing strength of the different nails or pins to be used can be computed in advance and these values stamped on the valve if desired. The stem 8 has an opening 25 therein to receive the shear pin. This opening may be of the same diameter as the largest opening in the cap 19 so that it will take any size shear pin. The stem may, however, be provided with additional openings, such as 26 and 27, which correspond in size to the openings 23 and 22, respectively.

With the present arrangement, the valve may have a varied application because it can be marketed with shear pins or different strength, or instructions may be provided to use ordinary forms of nails as shear pins and the shearing strength of different size nails provided.

The general arrangement and assembly of the housing and valve member provide a very convenient arrangement because the shear pins may be replaced without removing any portion of the valve whatever, and it is only necessary to move the valve member back to the position shown in Fig. 1 after it has released in order to re-set the valve. The desired size of shear pin can then be inserted, and the valve is again ready for operation. The valve is particularly adapted for locations where it is probable that the valve will remain inactive for long periods of time, because under these conditions the packing member 9 becomes vulcanized or corroded and adheres to the seat 13. When the excessive pressure occurs, however, this pressure is exerted on the end of the stem 8 and the face 12 of the packing to such an extent that the stem will yield and cause shearing of the pin without any movement or breaking of the seal between the packing and the housing.

What is claimed as new is:

1. A valve comprising a housing, a valve member, a stem on said valve member passing through said housing, said stem and housing having a plurality of aligned openings of different sizes spaced axially of said stem and housing whereby frangible pins of different sizes may be inserted to give desired shearing strength.

2. In a shear relief valve a valve member, a stem therefor, a housing for said member, a cap about said stem, and a plurality of different sized diametrically arranged intersecting openings in said cap intersecting said stem so that pins of suitable sizes to fit said openings may be inserted to vary the pressure at which said valve will open.

HERBERT ALLEN.